United States Patent
Frankel et al.

(10) Patent No.: US 7,184,988 B1
(45) Date of Patent: Feb. 27, 2007

(54) METHODS FOR OPERATING INFRASTRUCTURE AND APPLICATIONS FOR CRYPTOGRAPHICALLY-SUPPORTED SERVICES

(75) Inventors: Yair Frankel, Westfield, NJ (US); Charles T. Montgomery, Saverna Park, MD (US); Stuart Stubblebine, Lebanan, NJ (US); Marcel M. Yung, New York, NY (US)

(73) Assignee: Certco, Inc., New York, NY (US)

( * ) Notice: Subject to any disclaimer, the term of this patent is extended or adjusted under 35 U.S.C. 154(b) by 0 days.

(21) Appl. No.: 09/492,534

(22) Filed: Jan. 27, 2000

Related U.S. Application Data

(60) Provisional application No. 60/117,752, filed on Jan. 28, 1999.

(51) Int. Cl.
*G06Q 99/00* (2006.01)
*H04K 1/00* (2006.01)
*H04L 9/00* (2006.01)

(52) U.S. Cl. .................. 705/67; 709/203; 709/223; 709/224; 709/227; 709/217; 709/220; 709/229; 707/10; 705/1; 370/469; 370/352; 370/235

(58) Field of Classification Search .............. 705/1, 705/26, 53, 67; 709/203, 217, 223–229; 707/10; 370/469, 352, 235
See application file for complete search history.

(56) References Cited

U.S. PATENT DOCUMENTS 5,732,400 A * 3/1998 Mandler et al. .............. 705/26
5,802,497 A 9/1998 Manasse
6,336,095 B1 * 1/2002 Rosen .......................... 705/1

FOREIGN PATENT DOCUMENTS

EP 0 693 742 A2 1/1996
EP 0693742 A2 * 1/1996

OTHER PUBLICATIONS

O'Mahony et al. Electronic Payment Systems © 1997 ARTECH House, Inc. Norwood, MA (pp. 125-143).*

* cited by examiner

*Primary Examiner*—James A Reagan
(74) *Attorney, Agent, or Firm*—Pillsbury Winthrop Shaw Pittman LLP

(57) ABSTRACT

In an infrastructure in which some of a plurality of entities provide cryptographically supported services, a method of registering a subscriber entity of a plurality of entities at a principal entity of a plurality of entities, the method comprising the subscriber entity requesting service from the principal entity by sending a request message to a registrar entity of the plurality of entities; the registrar entity verifying the subscriber entity and forwarding the request for service to the principal entity; the principal entity storing the forwarded request and transmitting an acknowledgement message to the registrar entity, the acknowledgement stating acceptance and authentication/authorization information that the subscriber entity requires for the requested service; and the registrar entity verifying the authenticity of the received acknowledgement message, and, if correct, forwarding the acknowledgement message to the subscriber entity.

46 Claims, 6 Drawing Sheets

METHODS FOR OPERATING INFRASTRUCTURE AND APPLICATIONS FOR CRYPTOGRAPHICALLY-SUPPORTED SERVICES

RELATED APPLICATIONS

This patent application is related to and claims priority under 35 USC § 120 from co-pending provisional U.S. Patent Application No. 60/117,752, titled "METHODS FOR OPERATING INFRASTRUCTURE AND APPLICATIONS FOR CRYPTOGRAPHICALLY-SUPPORTED SERVICES" and filed Jan. 28, 1999, which is incorporated herein by reference.

This patent application is related to and claims priority under 35 USC § 120 from co-pending U.S. patent application Ser. No. 09/206,381, titled "RELIANCE SERVER FOR ELECTRONIC TRANSACTION SYSTEM" and filed Dec. 7, 1998, which was a continuation application of U.S. patent application Ser. No. 08/767,257 (now U.S. Pat. No. 5,903,882) which is incorporated herein by reference.

This patent application is related to and claims priority under 35 USC § 120 from co-pending U.S. patent application Ser. No. 09/026,466, filed Feb. 19, 1998, titled "COMPUTER-BASED METHOD AND SYSTEM FOR AIDING TRANSACTIONS," which is incorporated herein by reference.

BACKGROUND

1. Field of the Invention

This invention relates to cryptographic and distributed trust mechanisms for automatic service provision via computer and communication networks.

2. Background & Summary

Basic cryptographic infrastructure techniques and methodologies are known. These techniques and methodologies include Certification Authorities (CAs) and other Trusted Third Parties. The notion of providing reliance to transactions in the context of an infrastructure supporting assured transaction between users is described, for example, in co-pending related U.S. patent application Ser. No. 09/206,381, titled "Reliance Server For Electronic Transaction System" and filed Dec. 7, 1998, which was a continuation application of U.S. patent application Ser. No. 08/767,257 (now U.S. Pat. No. 5,903,882), and in related U.S. patent application Ser. No. 09/026,466, filed Feb. 19, 1998, titled "Computer-Based Method And System For Aiding Transactions," where an infrastructure for provision of the reliance and assurance was identified.

The infrastructure is generally composed of many local representatives that are system's entities when infrastructure is viewed as a system. The infrastructure is established, e.g., to register users and business clients so as to support assuring and providing warranty to support transactions between the business entities and users.

This invention provides complementary methods for organizing, maintaining and dynamically managing the infrastructure as well as further methods for the applications involving the operation of the infrastructure and of its users. This invention also provides dynamic tools for a multi-enterprise, multi-entity infrastructures and further involves methods of their organization, set-up, maintenance. This invention also provides methods for dynamic management of the relationships between the entities and the various users of the infrastructure. The exact nature of maintaining the linking and the mechanisms to support the linking of locations into an infrastructure are also provided.

The present invention transforms the basic cryptographic tools, security technology such as access control and delegation mechanisms, data base technologies as well as computer, networking and the World Wide Web technologies, into a coherent service where providers are organized, dynamically maintained and operate with clients with other business institutes and work amongst themselves.

Maintaining and operating dynamically of a service using electronic transactions needs to be trustworthy, secure, private as well as robust is typical in sensitive services such as financial, banking, insurance, medical, international commerce and other commercial areas, export/import business, media and information services, services where political constraints are crucial, and many other areas which may require support to achieve the required trust, support, security and other assurances. These numerous areas require the infrastructural support and dynamic maintenance and operation as provided by the present invention.

This invention employs basic cryptographic and security and integrity mechanisms such as digital signatures, electronic contracts and agreements, digital certificates, electronic documents messaging and reporting, encryption, key escrow and recovery, access-control, delegation techniques and communication protocols to provide an infrastructure and applications required to render on-line services.

This invention also provides services that are associated with endeavors that require trust and accountability for transactions conducted and where there are numerous entities involved.

In another aspect, this invention involves the deployment of methods and mechanisms to establish a service infrastructure of system entities and maintain the relationships among them.

Further, this invention involves methods for enrolling users and enterprise representatives as subscribers to the services provided.

This invention also involves methods for operating and supporting the service provided among the system entities themselves and among the system entities and organizations not enrolled within the system.

This invention involves methods to regulate and monitor service transactions conducted with subscribers of the system.

This invention incorporates methods that dynamically maintains and expands all relationships among the system's entities as the system evolves and changes.

Further, this invention provides various methods that are interrelated and connected to assure a coherent, flexible, trustworthy and robust service providing mechanism.

The systems and methods of the invention employ a trustworthy, flexible and robust services involving trust and assurance of transactions conducted. The system and method are useful in various areas where certain commercial and financial activities are moved to an electronic network domain such as the Internet. Typical areas where cryptographic and trusted control features of the present invention may be needed are: financial services, insurance services, medical services, various government, notary services, commercial services, news, information and media services, political consulting services, government services, arbitration services, international market services and legal services.

For example, the methods of the invention are especially useful for handling multi-enterprise organizations and dealing with numerous users and enterprises.

The invention identifies the basic cryptographic, computer and communication technologies and messaging supporting techniques required to support the service mechanisms. The invention provides methods for accomplishing trustworthy services involving flexible service procedures.

The invention is in the area of cryptography and distributed trust mechanisms in connection with automatic service provision via computer and communication networks. It deals with the use of basic cryptographic and security and integrity mechanisms such as digital signatures, electronic contracts and agreements, digital certificates, electronic documents messaging and reporting, encryption, key escrow and recovery, access-control, delegation techniques and communication protocols to provide an infrastructure and applications required in the service provision. The service is associated with an application area where trust and accountability of service transactions is required and where there are numerous entities involved. The invention involves and provides methods and mechanisms for establishment and maintenance of a service infrastructure of system entities and relationships among them. It further involves and provides methods for handling of users and enterprise representatives as subscribers to the service. The invention also involves and provides methods for operation and support of the service among the system entities themselves, and among system entities and other organizations. The invention involves and provides methods regarding service transactions with subscribers. Finally, the invention provides methods for dynamic maintenance of all relationships among the system's entities as the system evolve and changes. The various methods are interrelated and they are connected to assure coherent, flexible, trustworthy and robust service mechanism.

Such trustworthy flexible and robust services involving trust and assurance of transactions are envisioned to be useful in various areas where certain commercial and financial activities are moved to an electronic network domain such as the Internet. Typical areas where cryptographic and trusted control may be needed are: financial services, insurance services, medical services, various government, notary services, commercial services, news, information and media services, political consulting services, government services, arbitration services, international market services and legal services. The methods are especially useful for multi enterprise organizations, dealing with numerous users and enterprises. The invention identifies the basic cryptographic, computer and communication technology and messaging support required to underlay the service mechanisms. It suggests methods for accomplishing trustworthy service involving flexible service procedures.

BRIEF DESCRIPTION OF THE DRAWINGS

The objects and advantages of the invention will be apparent upon consideration of the following detailed description, taken in conjunction with the accompanying drawings, in which the reference characters refer to like parts throughout and in which.

DETAILED DESCRIPTION

Entities and Relationships

Figure 1:
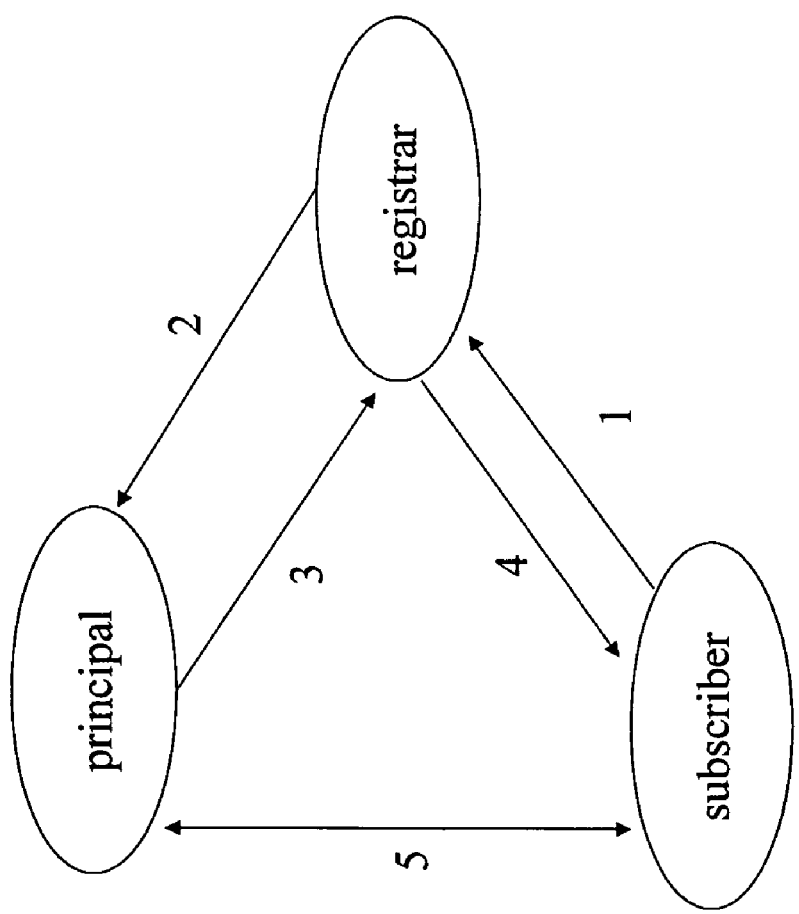
FIG. 1 depicts a primary registration protocol according to embodiments of this invention.

When a cryptographically-supported service is initialized, various entities are identified as the service providers. The entities may be certified as such and organized under a so-called service organization. Alternatively, the entities may be endorsed by some organizations or be certified by some other mechanism. There needs to be cryptographic means to achieve the acquisition and presentment of credentials for a service provider over a network. The credentials may be temporal or may change otherwise according to different rules. This invention provides a mechanism that represents such set-up and maintenance of service provision license. In general, in all these mechanisms, this invention provides for the ability to identify the authorities that can assure the certification and credentials of a principal (service provider). The numerous variations of organization may change as the system continues, due to changes of scale, regulations, and other characteristics of the service. This invention provides methods for long term maintenance of such changing environment.

The various entities within a system may have certain relationships, some bilateral and some public. These relationships have to be maintained with integrity. Long-term and short-term changes in these relationships have to be validated and synchronized in order to assure globally known structure. An example of a known structure is a hierarchy of certification authorities in the area of digital signatures and public keys; other organizational structures are possible. Other examples include: a division within a company that provides a sub-service; or a department within government performing a function which is globally recognized (for example, passport issuance—a passport issued by the Department of State is good for all state and country identification purposes).

Other relationships include service relationship where the receiver of service may move. For example, a customer may move between banks, thereby rolling accounts between banks. Some relationships are based on contracts signed between the parties. Some relationships are defined as participation in a system such as payment systems where a party can pay to another party or via their banks or organizations. This invention provides for the electronic maintenance of such relationships.

Other elements in the system are users that are individuals or groups of users. Users can be individuals or enterprises or enterprise representatives. They can be a group or can be organized as groups. Users and entities have long-term attributes and may be granted capabilities that may be later taken away. The distinction between users and entities that are enterprises is artificial since some of the users themselves may be enterprises and they may just use the infrastructure and applications to execute transactions and derived transactions for supporting the service.

The relationships between entities are in a general context of a service that may be associated with a sector of the industry such as financial, insurance, medical, government, and the like, or that may be an interdisciplinary service. The nature of a service may involve a suite of applications associated with the discipline, industry or sector. For example, and not to indicate restriction on the service, it can be assumed that the service supports transactions involving transfer of money and other financial instruments between users. Another example is the provision of a warranty regarding the identity and conditions associated with clients, guaranteeing payments and otherwise taking responsibility for completion of the transaction and perhaps take liability or other involvement. A further example of a service may be associated with consulting consumers about financial and commercial transactions. In addition to the financial area examples where banking and insurance are major services, many other areas of service can be implemented using the infrastructure and applications described herein.

In preferred embodiments of this invention, entities are assumed to have computer and communication equipment as well as software for performing transactions, communicating, preparing reports and documents and other computational and office support for conducting transactions.

Transactions and Processes

This invention provides methods to register users into services, and to allow them by authorization to be associated with service characteristics. This implies certain capabilities which are different for different users. Methods are also provided to allow for the registration to be changed/terminated (recording termination in all relationships are important events). Both the capabilities and the association of users with entities and their relationships may be changed. Methods are provided to manage the relationships between users and the service system. This management is trusted and provides a binding that is recognized by certain system's entities. The binding can be to the user or to the user's role or it can be anonymous, many variations are possible within the methods provided by this invention. Users and users' groups may belong to one enterprise and may be registered at another enterprise. The registration and maintenance process may be performed individually or in bulk groups.

The various elements in the system undergo various registration processes. First, the principals and registrars need to register and then other entities representing organizations will register. Note, one can employ one of the many know registration processes/mechanisms to allow registration of entities into a cryptographic or transaction systems.

To define capabilities or user characteristics, one needs to look at the nature of the service. In financial services the capabilities typically involve certain credits, payments, and authorized spending amounts. Additionally, capabilities may be related to level of credit, assurances, guarantees, and limits associated with users and organizations groups and entities. In other services, capabilities may be associated with access to a certain content, software or computing server. Capabilities may involve various authorizations associated with the characteristics and the history of a user and involve evaluation of risks associated with the user (for example, allowed medications in the medical area). Some capabilities are fixed (for example, attributes) or long-term, and some dynamically change over time (for example, behavior anomaly detection when users misbehave). Managing the capabilities and characteristic of entities and users are methods to be enforced.

Relationships and capabilities can be derived from the system's procedures, rules and regulations. Various representation methods are known to deal with generic rules and regulations and ways to enforce them. These rules are incorporated within the cryptographic and security infrastructure mechanisms.

Transactions are defined within the relationship structure between users and entities and between entities and entities, and between entities and authority organization. Users are getting service via transactions with various entities. A transaction is determined based on long-term relationships as well as on temporal constraints (for example, network connectivity). Transactions may involve numerous entities within the infrastructure. A user may direct a service request to some entity with whose organization that user is involved, this entity may deal with the service request or may forward it (or both), it may also create further infrastructure transactions. Finally the transaction is processed, risk management and decision making as well as data base maintenance and update take place, messages are exchanged and the service is provided. It may either end electronically or may trigger further operations which may be non-electronic.

Derived transactions are spawned on-line to support a basic transaction (for example, re-insurance, underwriting and aggregations). These derived transactions involve the on-going business and dealings between the entities. They may involve third parties who may deal with certain conditions of the user (provide insurance for a transaction) or parties which may provide additional service (affinity organizations). Entities may aggregate transactions or representations of transactions and deal with them as another transaction. Arbitration services may be invoked to provide anonymity and other assurances. Requirements to include on-line assurances (forcing the user to re-negotiate its status with some party) may be required. Other derived transactions, some of which are visible and some are transparent to the users, may be invoked. Note that the derived transaction may take the same structure as an initial transaction. For example, if the initial transaction deals with granting a warranty, the derived transaction may start by the warranty grating entity, where it is seeking collateral support or coverage or ancillary means for extending the required warrantee safely. An insurance transaction may result in a re-insurance transaction. These examples are typical and not exclusive to the nature of relationships between transactions and derived transactions.

Maintenance transactions may be required to support the infrastructure of entities and users. Reporting and messaging, as well as auditing and filing are part of the on-going support that is generally done off-line. Payment and accounting methods or triggering of payments outside the system, are included as part of the transactions. Risk management techniques, expert systems, artificial intelligence methodology, statistics and data mining may be used, for example, for anomaly detection regarding user behavior.

Numerous other maintenance procedures are possible, such as reiterating capabilities and refreshing cryptographic tools and keys using many of the key management and protocols available in the cryptographic literature, for example, in *Cryptography and Data Security* by D. Denning, and in *Applied Cryptography* by B. Schneier, both of which are incorporated herein by reference.

Technical transactions are added transactions that involve the overhead resulting from securing systems, assuring their availability, operation condition and integrity. Technical transactions involve cryptographic logging, integrity checks, secure messaging and other cryptographic mechanisms known in the art. Technical transactions involve transaction commit mechanisms for maintaining distributed data bases and fault tolerance communication protocols.

Security, Integrity and Privacy Considerations

Methods are provided to assure that entities and records and messages are protected within well-defined domains. Even service providers may not get certain information out of certain protective devices within their computer and network components. Privacy is important to protect both individual and businesses. Anonymity may also be important to protect. This invention provides methods to be included in the various component designs and transaction designs that will provide this secrecy, privacy and anonymity. Management of privileges is inherent to the process of jointly serving and getting service.

The operation of aspects of this invention assumes that cryptographic technologies using symmetric and asymmetric techniques are available, as well as access-control technology.

Furthermore, in communication it is assumed that each message that needs to be secured is encrypted by a key. The key is either shared by the sender and the receiver or derived from a key exchange protocol (for example, the Diffie-Hellman key exchange where one or both parties publicize a public key and the parties can derive a shared key). Further, messages that need to be signed for authenticity and proof of origin, are signed by the sender. Shared cryptographic information may be used for binding and connecting messages, logging and monitoring of messages.

Within a context of message exchange (a transaction), messages may be tagged by a transaction or session identifier, the participants, and the content of historic messages. The state of users may also be part of the tag. Using a tag and the available cryptographic tools (keys and shared random strings), the message can be authenticated as bound to the current context. Mechanisms for authentication are known in the cryptographic art. Such binding of messages assures the integrity of the entire transaction. Examples of such usage of cryptography for assuring transactional integrity are given in U.S. patent application Ser. No. 09/026,466, Frankel et al, (hereinafter "Frankel") which has been incorporated herein by reference.

In the description of protocols and procedures in the context of this invention, such cryptographic tools are assumed to be included in each message. The exact details of how to achieve it may follow Frankel, or may use other cryptographic methods to achieve transactional integrity and secrecy. The exact description of cryptographic integrity and binding fields is omitted where it is apparent to those skilled in the art how to employ, e.g., the methods of Frankel in the context and protocols of this invention.

Other cryptographic subsystems may be added to messages or may follow as sub-protocols, for example an electronic payment system that follows a successful transaction.

DESCRIPTION

The Service System Components

This section describes the basic primitives that are used throughout the discussion of this invention. First define some terminology is defined concerning the participants (entities) of the system and operations within the system.

Capability: A form of authorization.

Attribute: a feature associated with a named object.

Subscriber (or user). A system's entity (or a group of entities) that is to obtain some form of capability (that is, enrollment to an offered service) or attribution (for example, assignment as a role such as purchasing manager).

Group: a set of system entities (for example, subscriber group a group of subscribers, registrar group a group of registrars).

Supervisor: a system entity that is able to request changes for a user or group of a capability or attribute or the characteristics of entity's service.

Manager: a system entity that is responsible for maintenance and control of operations.

Auxiliary Agent; a system entity that is responsible for secondary and aid operations (e.g., time-stamping etc.).

Registrar: The systems entity facilitating the issuance of capabilities and/or attributes on behalf of a principal authority.

Principal Authority (or principal): The systems entity with authority over some attribute or authority to delegate some capability to a peer registrar.

Proxy/Interface: An entity in the system acting on behalf of other entities either as a conduit or as a legal representative of actions of entities.

Transaction: An interchange for a service related to a subscriber. It is based on the nature of the service.

Derived Transaction: An interchange which was initiated by another transaction. "Transaction" and "derived transaction" are used interchangeably herein.

Infrastructure Relations: There are sub-structures of the infrastructure that represent relationships amongst entities. For example, a certification hierarchy (within a digital certificate) may represent a substructure, certain relationships amongst entities are possible, for example a "preferred service relation" defines a priority structure that an entity prepares to direct certain service provision.

For cryptographic operation, a group is an abstraction defining a set of system entities or grouping of entities and already existing groups. Groups may consist of the same type of entities or mixed types. Of interest here are groups that consist of entities with some form of relationship (for example, entities from same company, same role, entities within a range of allowed liability amount, etc.). Note that there might be multiple supervisors for any group where different types of supervisor performing different tasks. For example, the registrar may also be thought of a special type of supervisor for a user or group but there may be other supervisors that deal with risk management for the same group.

From a cryptographic perspective, the system can be considered as entities as having both master keys and transactional keys. The master keys are only used to refresh transactional keys therefore the master keys are not used often and have limited functionality. Hence master keys are less prone to compromise. Note that any type of entities can potentially have a hierarchy of keys and it may be that the hierarchy is more than two levels. For instance, there may be one or more master keys to establish sub-master keys for different types of transactions and these sub-master keys establish the transactional keys. As noted above, the cryptographic portions of messages providing the various security and integrity functionality are added using the various keys.

Other transactional verification information such as transaction counts and state may be shared by two system entities to verify the validity of a transaction and to test for compromise of the keys. This sharing is used as additional protection included with authentication. For instance, if two parties who communicate regularly over a cryptographic authenticated channel maintain a transaction count, when a transaction count becomes out of synch it is an indication that the authentication key(s) of one of the parties has been stolen. User's keys and transactional verification information such as counters and state may be stored on physically secure devices such as a smartcard.

The above terminology is generic and covers the minimal function of each entity (or a function of a role of an entity in cases where an entity plays various tasks within the system).

Subscriber Registration, Capability Request and Contract Signing

The process of issuance of a capability or attribute for a subscriber on behalf of a principal with a registrar is described here. This section first describes the registration protocol with the incorporation of a registrar when the registrar is not used then for security reason there should be a physical means in which to authenticate the communication between subscriber and principal. As noted above, various entities are registered for the service with other entities. This section describes a registration mechanism which is an embodiment illustrating these types of registration. In fact, a registrar may be registered with a principal, an entity may be registered with a registrar or with another entity, a business unit may be registered as a client with an entity, a list of users or individual users may be registered with an entity, a proxy may register an entity with another entity.

As an example, during a bootstrap before subscriber registration occurs, the subscriber (similarly, principal) obtains possession of the public signature key or private authentication key of the registrar through some authenticated channel. This is the basic setup subroutine that exists in many cryptographic protocols necessary to establish authenticated cryptographic security channels.

The Registration Protocol

FIG. 1 depicts an exemplary registration protocol according to embodiments of this inventionError! Reference source not found. This section describes the message flows 1, 2, 3, 4, and 5. Note that all or parts of the messages may be encrypted. Encryption may be for (but not limited to) the purposes of session confidentiality between the subscriber and register. However, some message elements may be encrypted (under a key not known by the registrar) and passed to the principal. Any and all message elements may be encrypted.

The following acts are performed for provisioning of a service to a subscriber. (Note, the subscriber represent one or many systems entities.) Furthermore, before the beginning of this protocol there may have been a negotiation protocol between the various parties (subscriber/registrar, subscriber/principal, registrar/principal) in which terms of service are agreed upon.

The Subscriber Requests Service (Message Flow 1).

The subscriber sends a request associated with itself to the registrar. The request associated with message flow 1 contains:

An indication of the type of service requested (for example, to "subscribe" to an initial or certain additional services, to "modify" parameters associated with subscribed services, and to "unsubscribe" from services).

Optionally the request contains one or more of the following:

A unique reference to the subscriber, and/or session (for example, this can be the subscriber's identity, a pseudonym for one-time service, or a pseudonym for continued use of the service, etc.). The session identifier may link future responses to this particular request (or set of requests) which may include context information for subscriber when acknowledgement or refusal (rejection) message is received.

Attributes about the subscriber or subscription group such as:
  (a) self-representations and
  (b) third-party representations asserting attributes such as
    Addresses (for example, virtual address, physical address)
    Employment information (for example, employer)
    Information from other entities needed for service provisioning (for example, employee number from staffing office, etc.)
    Authorizations from other parties (for example, third-party approval for service, delegations, electronic "tickets").

Authentication information. This is information used by the service to authenticate use of the service. This may include public keys, shared secrets, and elements of a hash chains. It may also include other information, such as a round of a Diffie-Hellman key exchange, which can be later used to derive a secret value (for example, a key).

Transactional verification information such as transaction counts and state that may be used by the principal to verify the validity of a transaction. (This information may be encrypted to prevent the registrar from making transactions as the subscriber.) The validity assures that the transaction is correct within a stream of other transactions.

Representations by the subscriber agreeing to what the subscriber accepts (such as the terms and conditions of the service, agreement to fees for services). Also, payments may be sent.

Preferred service relationships, to guide the service provider in what way to search for optional sub-services. Other infrastructure sub-relationships may be provided to guide the service provision.

Other information needed by principal(s), registrar(s) and other entities for acceptance of the request.

Other information needed by principal(s), registrar(s) and other entities to provision service.

Any other information needed by principal(s), registrar(s) or other entities (for example, auditor).

Subscriber's authenticator: which validates the current message and its origin.

Registrar Forward Request (Message Flow 2).

Upon verifying the subscriber (either via the authenticator of the request or other process such as in person request), the registrar forwards (with message flow 2) the request and any modifications to the principal. The registrar may verify the subscriber's request by itself or employing derived transactions with other parties. The forwarded request is authenticated by the registrar. The forwarded request may include information such: as:

The information (or subset) from flow 1 sent by subscriber to registrar. In addition the following may be sent:
  identity of registrar
  registrar's request identifier to link future responses to request which may include message context information for subscriber when acknowledgement is received
  Additional requested attributes and capabilities provided by registrar
  modifications to subscriber's requested capabilities, attributes and contract
  Identity of principal(s) accepted for request by registrar.

Public and/or private authentication keys to be used by the principal to verify future registrar's interaction. Or other cryptography related information.

transactional verification information such as transaction counts and state that may be used by the principal to verify the validity of this request. This information may be encrypted to prevent the registrar from making transactions as the subscriber.

allowed (accepted) cost for registrar's, principal's and other entities services contract for service stating what the registrar accepts registrar's request identifier to link future responses to this particular (or set of) request which may include context information for registrar when acknowledgement or refusal (rejection) message is received.

Other information needed by principal(s), registrar(s) and other entities for acceptance of request (for example, preferred service relationships).

Other information needed by principal(s), registrar(s) and other entities to provision service Any other information needed by principal(s), registrar(s) or other entities (for example, auditor).

registrar's authenticator (either private key authentication or public key signature) of the above information In case the registrar does not accept the request, it transmits (as message flow 4) an (authenticated) refuse message back to the subscriber with a reason for the refusal and supporting information, an identifier for rejection and the request (or a subset of the request) or hash of the request. There may also be a case in which the registrar may charge for its service, in this case there maybe a negotiating protocol in which the registrar and subscriber negotiate a cost.

The Principal Initiates the Response

Next, the principal initiates the response by storing the request after verification of the authenticity of the forwarded request (message flow 2) by the registrar. The principal may also verify the request of the subscriber if it has the capability to do such (that is, it has verification keys of subscriber). The principal may also perform other verifications that may be necessary before providing the capability these may include but are not limited to policy check, criminal record checks, bank account verifications, D&B ratings, employment verification, credit limits on accounts, etc. This may be done using a derived transaction. These third parties are essentially auxiliary agents and registrars that are not requesting a capability or attribute directly but rather just attesting to identity, attributes, and/or capabilities of the subscriber.

The principal now transmits to the registrar (as message flow 3) an acknowledgement stating acceptance as well as authentication/authorization information that the subscriber requires for the requested capabilities. Some of the additional information needed by subscriber to be able to use capability are policies, public key certificates of the subscriber as well as other entities in the system, instructions etc. may also be included. The use of a new request identifier, or previously generated one, to link future responses to this particular request may also be included in the message. Similarly unique cryptographic keys linked to the transaction, rather than identifiers may be used.

Other information that may be provided are accepted costs and accepted contract. This message (message flow 3) is authenticated for the registrar to verify and for the subscriber to verify (if the subscriber has a verification key of the principal).

If the principal refuses to provide the capability, it may send an authenticated refusal message with the reason for refusal as well as message flow 1 and/or message flow 2 (and/or their hashes) to the registrar or directly to the subscriber. The registrar can use the refusal protocol described in flow 2 to send to the subscriber.

1.1 The Registrar Verifies the Authenticity of the Received Message

The registrar verifies the authenticity of the received message (message flow 3) and, if correct, forwards acknowledgement (accept) message to the subscriber. The registrar's acknowledgement may include additional information such as its final cost for its service.

Message flow 5

1. Even though the principal initiates the request, it may be that the user must perform other operations to obtain the request to activate the service. The subscriber, after performing these operations, may not have obtained its requested capability at this time. The subscriber may be required now to perform additional communication with the principal to obtain its full capability. Additional information may have been sent to the user in the acknowledgement messages to be used for the activation procedure.

Note that the registrar may be an optional entity in the system. In the case that the principle can act in the responsibilities of the registrar then a more simplified protocol can be implemented by leaving the registrar's information blank.

Note that the above protocol could incorporate multiple registrars, principals and subscribers as well as throughout our discussion. Some examples are provided:

Multiple subscribers: It may be that the capability or attribute is based on a group. For example, a capability which can only occur upon the signatures of each of at least a pre-specified quorum from a defined set of subscribers, or a threshold signature scheme which makes a single signature from multiple subscribers (see, for example, "The handbook of Applied Cryptography" by Menezes, van Oorschut and Vanstone, which is hereby incorporated herein by reference). To allow for this the registrar may deal with each of the subscriber and send one batch or multiple requests upward. Another mechanism is that the requests are sent individually to the principal (via a registrar if desired) and the principal manages the requests when the necessary number based on policy and capability are received.

Multiple Registrars: A registrar may only be able to or allowed to request for specific attributes and capabilities. In such a case, there may be a need for multiple registrars to make a request such that the composition of the requests made provides for the composition of the capabilities. That is, if a user wants X which registrar A can request and the user wants Y which registrar B can request, then the user works with A and B to make requests to the principle. These requests can happen in a serial order, from A to B to the principal (similarly B to A); another alternative is when all requests each appears at the principal that combines all the requests into a combined capability/attribute. Also a registrar may be attesting only to a specific verification it performs rather than the capability it requests and the principal based on some policy requires more than one registrar to register a subscriber.

Multiple principals: in case a principal can not provide sufficient capabilities or attribute, and multiple principals can. This can be for example a group of multiple underwriters (who want to share the risk). Another example is for assuring financial and identity information associated with an entity: one principal may deal with identity verification whereas another one my deal with financial data (this separation may be a result of operational and privacy constraints).

For simplicity of discussion, these multiple entity protocol are allowed in any of the discussion discussed even when not discussed explicitly.

The registration may have a few stages: it can start with a negotiation where one is not "actually registers" but rather gets response with terms and conditions. It can follow with an "enrolment registration" where the entity is registered and can then be followed by an "activation registration" where the service actually starts. The various stages may be needed to assure integrity and allow for checking and verifications.

Note that a user may register with a proxy server as a service.

Note also that a proxy or a representative of a group may submit "in bulk" a group list for registration.

Many times the registration process is bilateral. Namely, whereas one side is assured by the registrar to have the capability to provide services, the other side is assured to be a credible service receiver. For example one side may request financial services, it has to be assured that the organization it is registered with is capable and knowledgeable in the area. On the other hand the organization has to know the background and some financial history of the requestor of financial service. Bilateral matching capabilities (receiver of credit against an issuer of credit) can be typical in many scenarios.

Finally, note that a response at the end of registration and other capability issuance procedures may be a microprocessor, diskette, or smartcard, or an information printed on paper which are sent out of band to the user. Many other variations are possible, known in the art, and are not excluded from this invention.

Contract Signing

The registration protocol of FIG. 1 can be used to provide for a contract signing protocol via a third trusted party. The protocol provides for fairness and mutual commitment by both parties signing.

The registration protocol is performed as the message flows of FIG. 1 to negotiate an agreement between principle and subscriber where the contract can be, say, an attribute or other information in the request. When the registrar observes that both parties agree (by noting that the principle acknowledged message), the registrar then has each party send an encrypted signature of the contract. Note that neither party can read the other party's signature but the registrar can. The registrar then verifies the signature of each party with the agreed upon contract. If both signatures verify then the registrar transmits, the principals signature to the subscriber and the subscribers signature to the principal.

This protocol is quite flexible. The protocol described here can be modified for more than two contract signers. It is also possible for the subscriber and principal to sign different documents that are mutually agreed to.

There exist other contract signing protocols which exists in the art that are usable in the architecture.

Modify Capability or Attribute

Similar to the registration protocol that adds a capability it may be the case that a modification, including deletion, of the capability or attribute is necessary.

One mechanism is for the principal to make a modification without the subscribers permission and an authenticated notification sent to the subscriber. The modification may be permanent or temporary and the notification can include Scope of the modification
Coverage dates
Reason for modification
Any additional information (for example, keys, etc.) needed by subscriber to perform transactions
Authenticator of all the above The modify operation may be initiated by the user. There are several mechanisms to perform the modify. A request to the principal through a registrar for a modification can be performed similar to a registration primitive by marking the registration request flag as a "Modify" or "Unsubscribe" rather than "Register". Generally, the registrar is a supervisor for the group. Another mechanism exists, when the user's verification key is held by the principal. In this case the user can make a request directly using the user's authentication key if the principal allows for the modify without a registrar. A modification operation may also be initiated by a supervisor of the user or group as well as by a proxy on their behalf.

The protocol flows carrying the information may follow the structure of the protocol of FIG. 1.

Refresh of Authentication Information or Other State Information

From time to time the information stored by the subscriber and principal may need to be refreshed. Consider the system as having both master keys and transactional keys. The master keys are only used to refresh transactional keys therefore the master keys are not used often with and have limited functionality. Hence they are less prone to compromise. Refresh may be a mechanism to maintain capabilities, where reiterating a capability every so often maintains its validity.

This can be achieved by the principle and subscriber both establishing master keys as well as state information during the registration protocol or a subsequent protocol. Then using the established master encryption and/or authentication keys, the subscriber can perform an encryption over an authenticated channel in which the subscriber, registrar or both transmit information privately which can be used to establish new transaction keys as well as state information. Using an authenticated public key exchange protocols such as a Diffie-Hellman key exchange, private channels are not necessary. Also authenticated channels are not necessary here when private keys are shared by each party. A private function is performed on a nonce to generate new transaction keys as well as new state information then each party proves that they know the new transactional keys and state information before discarding the old key and state. Numerous other methods for refreshing information are available in the art.

Pseudonyms

It may be the case that a subscriber will use a pseudonym for later transactions. In such a case there are multiple methods that can be incorporated into the registration protocol.

A pseudonym may be encrypted as the identity of the user with an encryption key that the principal can later use to decrypt and obtain the true identity. This may be part of the registration flow sent from subscriber to registrar and then to principal. It may also be agreed to after the registration protocol using keys established during registration and it may also be generated by the principal and sent to subscriber in the acknowledgement message in the registration protocol. There are various ways in the art for getting and maintaining pseudonyms for long term, short term and per-transaction usage.

Reporting

There may be regular reporting by entities to one another. Establishment of authenticity may be through private key authentication, public key authentication, physical delivery (for example, mail), and other means. It is expected that there will be regular reporting of the state of capabilities and attributes from the principal to the subscribers, groups, supervisors, and other entities. It is especially important that regular reporting is performed where state and attributes are dynamic, such as in reporting credit balance, authorization limits, etc.

Various methods for editing reports, validating, signing, and sending them are known in the art.

Monitoring

In order to ensure firm control on entities that perform critical functions, it may be necessary to have a management type entity which authorizes the action of another entity on a per transaction basis. The structure of the protocol would ensure that the entity be subject to monitoring could not negate the monitoring operation. Monitoring techniques are available in the art.

Notification Message

A notification message is a message, usually authenticated, in which a subscriber notifies its principal about its capability, attributes or status of a transaction. It may also request performance from the principal.

As example it may be a notification by the user that the quality of service is insufficient from the principal. Depending on the agreement between subscriber and principal, it may request compensation. It may be a claim on a warranty, insurance or other obligation of the principal to the subscriber for a transaction(s). In such a case it provides supporting information (all or a subset of communications related to the transaction(s)). When compensation is requested the notification may state what is expected compensation and how it should be delivered. Depending on the service and relationship, may be a request for an additional month free of the principals service, or request a check in the mail (with address specified), or it may request a wire-transfer to a bank account or an IOU or bank draft. It may request a change in capability or attribute such as increase the credit limit. It is foreseen that notification messages can provide for many variances and are dependent on the working environment.

There typically is a response (acceptance, rejection or proposed modification) from the principal to the subscriber. There may be a need to perform a negotiation protocol (similar to the contract signing which may or may not include a registrar) until acceptable agreement is made where there is linking of notification and response. These messages may also inquire on additional supporting information such as contracts, cancelled checks and other information not provided in the notification message.

Though notifications are primarily between principal and subscriber they are not limited to these parties. It occurs were there may be disputes, for instance, in the system. Hence between registrar and subscriber, and between principal and registrar. These relationships may be fee and quality of service based for instance. And in particular to registrar it may just be a request to find status of a registration request.

Modify Transaction Processing Procedure

Similar to a notification, it is a request by, a user, say, which directs another entity to change certain procedures. Changing relationships and agents and preferred service relationships, as well as other transactional properties that are at the discretion of that user (or entity).

Note that there are capabilities that are modified by the entity itself at its discretion whereas other capabilities need external approval.

Service Migration

An entity or group may move affiliation of entities providing services. For example a group of subscribers may change the registrar and principal used to provide a specific service. Generally this would be a supervisor with the authority to request such a change. This capability could be used to change service provides with minimal disruption to the subscribers.

An additional use of this function is to allow services for several groups to initially be provided by an entity when the group sizes are small and allow movement of the provided service to a new service provider. In such cases the "branding" or identity used by the service provider may reflect the later envisioned structure.

An interesting migration of services is transferring it from an external entity (proxy, service provider) to oneself. For example, a company may authorized another company to give services to its employees (certification authority services, financial services). At another time the service is moved to the company itself.

Cryptographically, such migration may require 'safe key transport' employing techniques for moving cryptographic keys safely without opening them.

Figure 2:
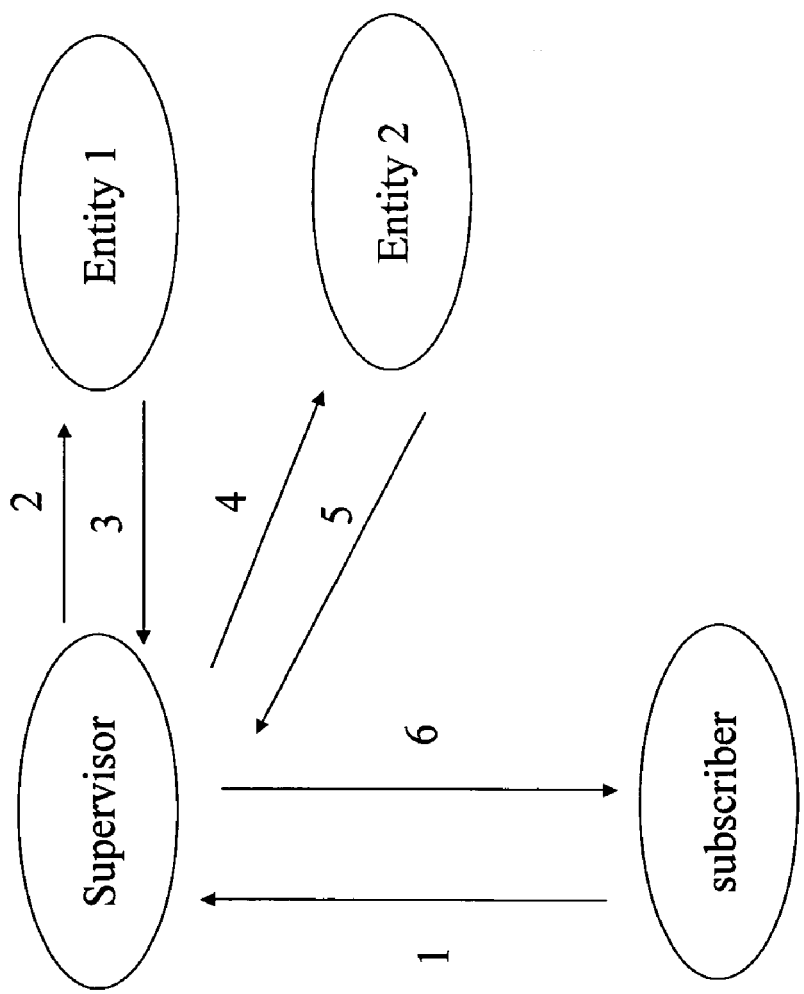
FIG. 2 depicts a service migration and example according to this invention.

An exemplary protocol for migration of services as depicted in FIG. 2. The user (subscriber) initiates an authenticated message (Message flow 1) which indicates which service should move from which entity to which entity, say, e.g., from entity 1 to entity 2. The message flow 1 is sent to a supervisor in charge of authorizing and assuring capabilities within the system. The supervisor checks the originality, validity and integrity of the message (message flow 1). The supervisor then produces message flow 2 that includes instructions to entity 1 to give the capability of the specified service back to the supervisor. The capability is moved to the supervisor by entity 1, after checking the validity and authorization of the supervisor. Entity 1 sends message flow 3 to the supervisor indicating relinquishing of the service. The supervisor then sends message flow 4 which alerts entity 2 that the specific service on behalf of the user is asked of it. Entity 2 then answers the supervisor in message flow 5 and the acceptance or rejection may be forwarded back to the user on message flow 6. The service may either start or a registration transaction may be required to assure entity 2 the actual registration of the user. In case of rejection the user is notified and it is assumed that the supervisor now holds the service. The user may want to re-initiate the protocol to migrate the service from the supervisor to another entity different from entity 2.

The above is merely one scenario of how to handle migration via a supervisor; it illustrate the needs to assure revocation of capabilities at entity 1 and granting of service capability at entity 2.

Service Bureau Components

Figure 3:
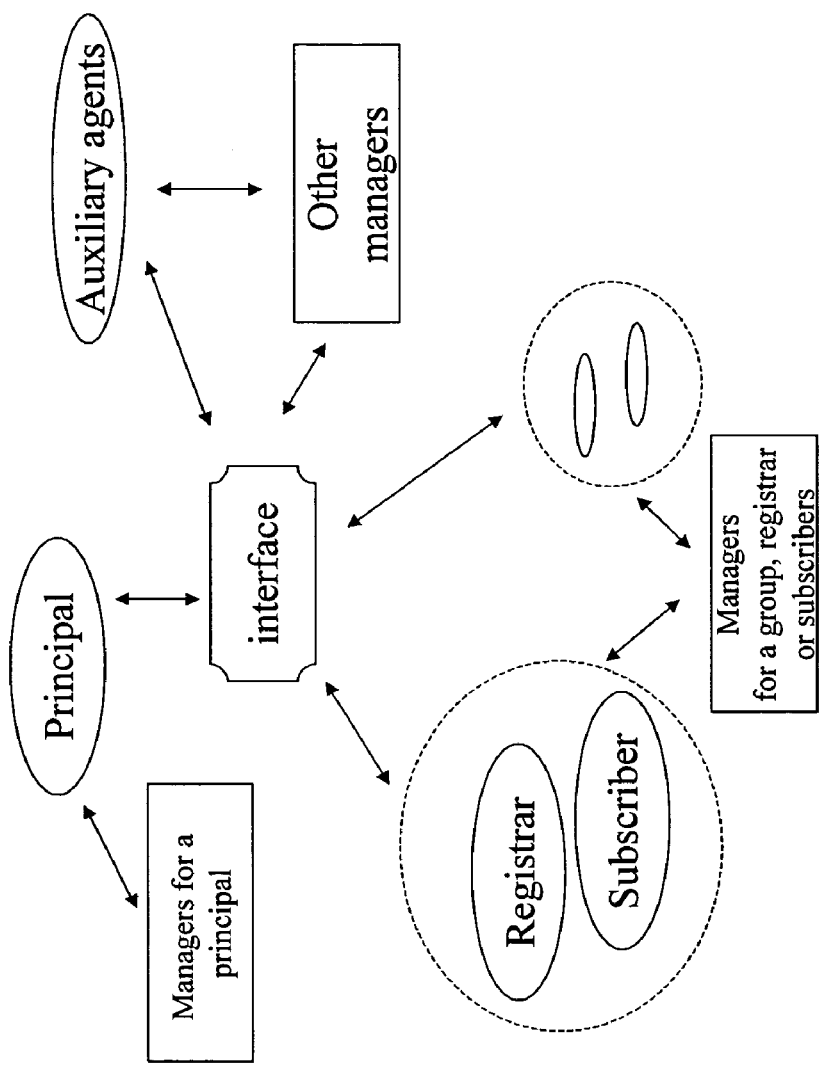
FIG. 3 depicts a backend infrastructure according to embodiments of this invention.

FIG. 3 depicts components of the backend infrastructure according to embodiments of this invention. This section expands upon the concept of providing a capability by using the primitives defined above. The sections above described functional descriptions and do not define the actual components. There are multiple configurations possible.

Registrar(s)

The registrar entity may itself consist of multiple entities. This may be necessary for replication of service or a compartmentalization of the registrar's capabilities. For instance, there may be some registrar's which are allowed to make a request for attribute while others cannot.

A registrar is designed into a system as follows:

One or more root registrar authorities are generated as well as a registrar's registrar. Now, using the registration primitive, a new registrar, acting as a subscriber in the primitive, can request through the registrar's registrar, acting as the registrar in the registration primitive, to have a registrar capability/attribute to the root registrar, acting as a principal in the registration primitive.

Figure 4:
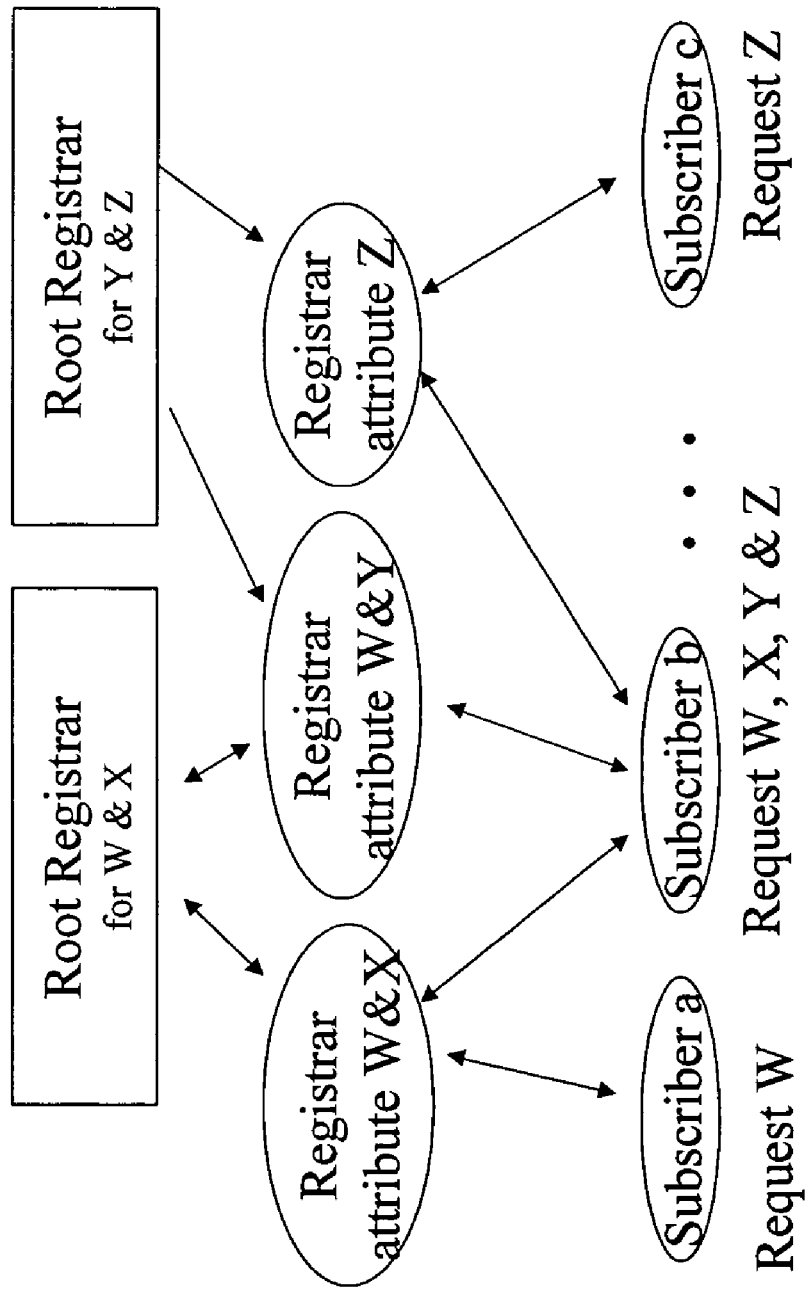
FIG. 4 depicts a registrar infrastructure according to embodiments of this invention.

FIG. 4 provides an example of a two-root registrar having multiple registrar's which are allowed to request different attributes for subscribers. Notice that subscriber b uses all three registrar's to obtain attributes W, X, Y and Z. On the other hand subscriber a uses only one registrar to obtain attribute W. Requests from subscribers may or may not go to root registrars depending on the capability and attributes defined by the non-root registrars and those capabilities and attributes provided by the principal that gives them authorization.

The system discussed above and illustrated in FIG. 5 can be enhanced with the addition of a management monitoring function. The goal is to ensure proper operation of Entities 1 and 2. As illustrated, this includes per transaction observation by the manager. One of the management functions may be to limit the total liability allowed outstanding by Entities 1 or 2. This is supported by per transaction exchanges A, B, C and D.

Several techniques are employed to ensure that transactions do not occur without proper monitoring. The first is that each transaction can be reported by two entities. (Entity 2 will report even if Entity 1 is the only liability holding party). Another technique includes a validated component included in the return message from the manager to the final relying parity (User 1, User 2 or possibly both). This validated component was included in B or D and is carried along the return path to Users 1 or 2 as required.

The Subscriber(S)

The subscriber (with reference again to FIG. 3) is initialized via the registration protocol. As a process, the subscriber obtains directions from a system entity or via a third party (not shown). The subscriber then gathers the necessary information it needs to make an acceptable request to the registrar(s). The parties may negotiate a contract or terms and conditions (for example, fees) for the service (characterized by the capabilities and attributes). Upon response of an acknowledgement from the principal(s) or registrar(s), the subscriber's requested capabilities and attributes and other information for service provisioning are initiated and the user may require further interaction to complete the setup. On a rejection the user may need to perform this operation again.

Note that requests and rejections may be identified so that future interactions can be linked. This allows the maintenance of history, auditing and can reduce costs since some processing may not need to be repeated if its already been performed.

Observe that a subscriber, may be a principal with respect to some other subscribers. As described above, a subscriber may be a registrar for instance, or another entity in the system. Note that the infrastructure is not just hierarchical since a subscriber may use multiple principal(s) to be a principal of higher capabilities for instance. This also allows for more than one root principal. The design is very flexible.

The Principal(S)

The principal itself may consist of one or more entities. This may be necessary for replication of service or a compartmentalization of the principals capabilities.

To construct a principal within the system, one or more root principal authorities are generated as well as a principal registrar. Now, using the registration primitive the new principal's, acting as a subscriber in the primitive, can request through the principal registrar, acting as the registrar in the registration primitive, to have a principal capability to the root principal, acting as a principal in the registration primitive. This is as discussed above.

Group Registration

A subscriber (multiple subscribers) can be incorporated into a group via their asking for specific capabilities and/or attributes of a defined group during the registration protocol with a registrar having the capability to register users of the group. Similarly it can be performed via a modify protocol. Establishment of group managers and supervisors may be determined at this point.

Similar protocols can be performed for establishing groups of other types of entities, such as principals, registrars, etc. In addition, a proxy may register a group.

Manager(s)

There are several types of managers. Managers are initialized in a similar manner as subscribers but with a role of a manager. A systems entity may be specified as a manager via an attribute certificate. Furthermore, a manager may receive capabilities, delegations, and possibly other information.

The manager for an authority principal may have many functions. These include functions such as auditing registrars, archiving interactions, anomaly detection, quality assurance functions such as random testing, and aggregation of system parameters. A key role of the manager is to manage shared resources. For example the manager may delegate the assignment of the certain portions of the "address space" (associated with a field) to each registrar. Another role of a manager is to restrict communication access (or rate of access) to certain system entities.

Managers may also have the role of grouping, and associating transactions. For example, the manager may segregate transactions by categories. For example, transactions may be categorized by risk. Also, sets of transactions can be combined into larger groups. Each of the larger groups may have common properties such as value, risk parameters, or each having the same initiating party.

There are also managers that receive reporting from other managers and entities for groups and subscribers. These may play as managers with an auditing role, risk management role as a supervisor which may request changes to a subscriber or group or just route reports to the appropriate entities. They are known by the appropriate entities that they receive reports.

Some managers are the supervisors for groups or subscribers which may act as registrars for a group. These supervisors may also request changes to a group's capabilities, attributes or something else.

These managers may perform a cryptographic function as well. For instance, they may perform backup functionality for keys and subscriber provisioning information. This may be necessary for legal and/or robustness reasons, for instance. Note again that a subscriber can essentially be any entity including other managers.

Operations within the Infrastructure

Having described the infrastructure and components such as a service bureau, we now describe the operations within it given a (possibly overlapping) set of registered entities and service entities.

An entity such as a first user may initiate a transaction requesting warranty, the initiation is with a system element (a principal) where another user is registered for credit. The basic example may be that for a certain context of transaction the first user initiates a warranty request. The flow of messages of the transaction may follow the ones of Frankel et al. where the exact nature of messages was disclosed. In the extended context of registered users, the provider has to check the registration status which becomes part of the user's history and state. The transaction involves a second user and the infrastructure entity where this user is registered for the service, namely the entity that can assure the first user that the representations made by the second user are valid. The first user gets the warranty.

Note that the warranty issuer may consult with risk management subsystems or with an auxiliary agent that assesses the risks involved.

When a transaction like this is complete, the first user is assured of the fact that the other user will provide what is required by the transaction. Otherwise, it has a warranty against the entity that issued it on behalf of the other user. If the transaction fails, a follow-on transaction (for example, notification) for claiming what is due as derived from the warranty may be issued. Some compensation may be sought in this follow-on transaction.

Note that the transaction where a user initiates a claim requiring some compensation may go to the primary entity that has originally issued the warranty. It may start a transaction requiring another entity (an insurance entity) where it is insured. This is a derived transaction where the insurance entity may provide some coverage to the primary entity and the primary entity, in turn, will provide some compensation to the user. The derived transaction message flows can also follow a partial set of messages of [Frankel et al.]. Another derived transaction is where the re-insurance transaction is based on an aggregate of many initial transactions.

Figure 5:
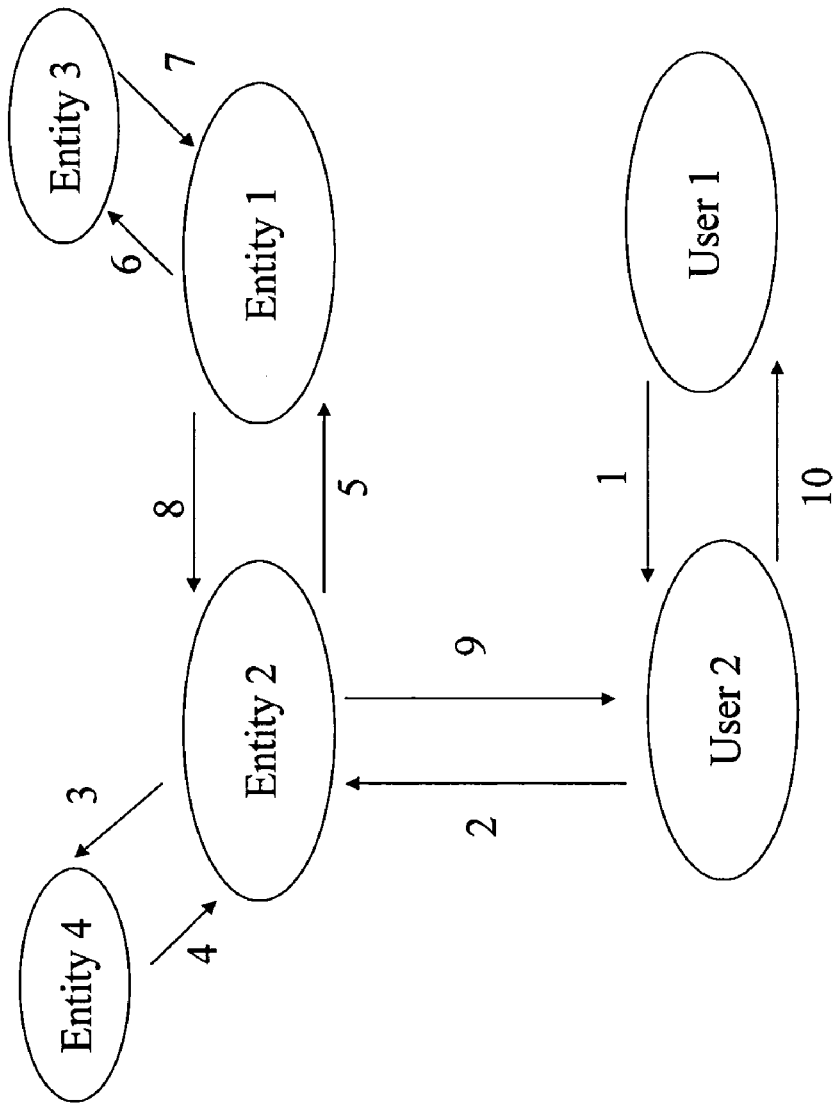
FIG. 5 depicts operating a combined transaction within the infrastructure and example according to embodiments of this invention.
Figure 6:
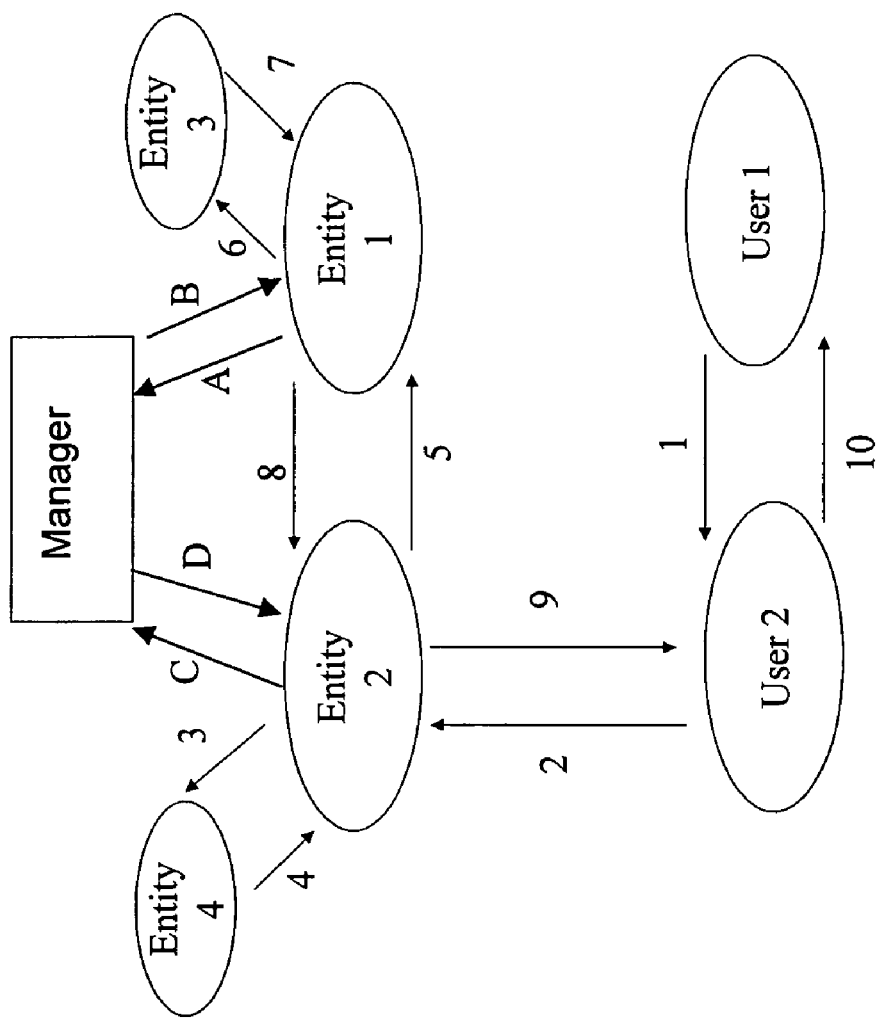
FIG. 6 depicts operating a combined transaction with monitoring service according to embodiments of this invention.

An example is depicted in FIG. 5. User 1 needs warranty with respect to user 2. User 1 sends a message (message flow 1) with its request to user 2. User 2 checks the message validity and accuracy with respect to the description of the transaction and the session the users have been conducting. User 2 then forward the request for warranty and its on validity and authenticity information to its service provider which is supposed to deal with the subject of warranty in the context of the current transaction, namely entity 2. Message flow 2 carries the request. Entity 2 is then initiating a derived transaction with entity 4. Entity 2 forwards it a message flow (message flow 3) which may request assurance regarding a certain fact, for example, that the transaction content is valid and it is legal to deal with this transaction. Entity 4 may take liability in case the transaction is not legal. Entity 4 answers entity 2 with message flow 4, providing the liability service. The information from message flow 2, possibly the information related to message flow 5 and required cryptographic fields are sent in message flow 5 to entity 1. The content of message flow 5 is validated and entity 1 starts a derived transaction with entity 3. Entity 1 may forward to entity 3 in message flow 6 a description of the transaction and the information it has about it, it may forward the contract conditions between itself and entity 2. The transaction may involve insurance against the warranty to be issued. Entity 3 may evaluate the information of message flow 6 forwarded to it. Entity 3 may decide to provide insurance. This is forwarded back on message flow 7. Now entity 1 is able to evaluate the risk involved in providing the warranty. Entity 1 may decide to provide the warranty requested (or part of it). This is forwarded on message flow 8 to entity 2. Entity 2 may record the information received and may validate its accuracy, integrity and origin. Entity 2 then forwards message flow 9 with its assurances and the response of warranty. User 2 may accept the warranty and forward message flow 10 with acceptance to user 1.

As a result of the process being completed, certain other transactions allowed by the warranty take place. If everything goes well, a report on it may be initiated from the users. In case of some failures user 2 may start a claim against entity 1 and derived transactions involving other entities (entity 3 as the insurer etc.) may take place. Transactions of this nature may involve negotiation of payments and payments by the insurer, by the warranty taking party and by other parties (such as underwriters).

Aggregation of information may result in bulk reporting of transactions. This will result in reconciliation and claim processing transactions. This also opens the possibility of automatic auditing of records and easy compliance with regulations and other legal requirements.

Note that the above combined transaction (one initial warranty transaction, and derived legal assurance and insurance transactions) involve certain pre-existing relationships between various entities where some entity is currently registered with another entity for service. User 1 is registered at Entity 1 for issuance of warranty in the specific area of the transaction (namely, User 1 will seek Entity 1 to issue warranties against representations made by User 1 in the specific area). User 2 is registered with entity 2 for assuring identity and certain capabilities and attributes of entities such as Entity 1. Entity 2 is registered in entity 4 for provision of legal assurances regarding representations. Finally Entity 1 is registered with Entity 3 for insurance against extended warranties in the specific area of the transaction.

All registrations are bilateral in the sense that when Entity 4 is registered for giving legal services for entity 2, Entity 2 on the other hand is registered with Entity 4 as a credible server for users who seek warranties in the area of the transaction.

The above example is merely an illustration of operating the infrastructure. Many other uses can follow, insurance request and policy issuance, letter of credit request, document transformation transactions where the service involves signing ownership of documents, allowing access to information, transforming bill of lading, etc. The internal message flow structure and the usage of cryptography can follow from what is disclosed in [Frankel et al.] and the one skilled in the art can adapt the various fields according to the new context.

In fact, FIG. 5 itself can represent numerous other scenarios of operation. In particular it represents another totally different scenario, involving validation of the state of a user within a financial certification authority infrastructure. Assume User 1 wants assurance regarding User 2 the assurance involve the current validity of the digital certificate of the user which assures its identity and validity of the representation of the financial state of User 2. User 1 may initiate a validation query (with freshness information) in message flow 1, User 2 forward the query and authorized the query to Entity 2 which may be its bank that maintains its financial state. Entity 2 starts a derived transaction to assure that the identity of the requester (Entity 1) is correct. It initiate a query to the Certification Authority (CA) of User 1 which is Entity 4 (this is done via message flow 3). The validity may be approved by the CA via message flow 4. Now the bank (Entity 2) can forward via message flow 5 a query of the validity of the identity of User 2 to Entity 1 (which may be another bank that operates a CA on behalf of Entity 2). Upon getting the request of certification check, Entity 1 may query an operator of a repository that works for it, which is Entity 3. It sends the query to Entity 3 on message flow 6 and gets a response on message flow 7. Now the validity of the certificate (the identity) of User 2 is assured and forwarded via message flow 8 to Entity 2. Entity 2 now checks the financial state of user 2, it sends the validation of the financial state along with the validation received via message flow 8 of the identity to User 2 via message flow 9. Now user 2 can forward the complete validation of identity and financial state to the requester User 1. Since cryptographically speaking the entities along the transaction chain also used binding to the freshness information, User 1 knows that he got a correct and current representation regarding User 2.

The underlying registration for service in this transaction is as following. User 2 is registered for identity validation with Entity 1, User 1 is registered for the same service at Entity 4. Entity 2 is the bank of User 2 and is responsible for reporting User 2's financial state (and it may get CA services for all its users From Entity 1). Entity 1 has leased repository services from Entity 3. Note that User 2 has its service split among Entity 1 and 2: one is responsible for certifying identity and the other for certifying financial information.

The above examples have concentrated on financial services and certification of identities. Requests in other service areas are similar. Request for medical records and response with the requested information from the record is another transaction that can be performed using the infrastructure and following the message flows mentioned above. Requests to "access sensitive information" may be dealt similarly where a remote user asks a server which makes sure the infrastructure allows the release of certain content to the other user.

In all embodiments of this invention, messages and/or transactions may be preceded by negotiation of terms, e.g., negotiation of a fee for provision or support of the message and/or transaction. Reports may be generated of any and/or all of the interchanges between any and/or all parties to a transaction. These reports may be provided to any entity related to the transaction. In all embodiments of this invention, pseudonyms may be used by any party to a transaction any and/or all messages may be encrypted and/or authenticated. In all embodiments of this invention, all messages may in fact be batches of messages.

Examples of Service Operation its Implications and Properties

This invention allows and enables numerous organizations of a service business. It allows and enables many organizations to get together and decide on a joint venture for the sake of services. It allows and enables a regulated industry to operate an "on-line" business while being authorized and licensed. It allows and enables enterprises to organize and support services.

Some illustrations are provided below of how the methods described herein can be employed. Many other cases are possible within the spirit of the methods that require the essential elements of the current invention, these changes and modifications are therefore to be understood as not departing from the spirit of this invention. For example, many operations within the methods can be made via a proxy or an interface; such additions are expected and are covered by the current invention. Various other agents and pieces of equipment can be used as part of the system (special hardware, use of mail and other means); these are also covered by the current invention. The disclosed embodiments are therefore to be considered in all respect as illustrative and not restrictive.

We discuss some instantiations of employment of the invention.

The invention allows relationships between various bodies/entities: an enterprise can give services (be a service bureau) to another enterprise, where the service terms and conditions are certified as available credentials which are made visible only to users associated with that other enterprise. Users of one organization may be served by other organizations. The terms and conditions for the service may change and it further allows service providers to offer services to users in a way that is competitive. Users can make decisions based on certified characteristics of the service providers (and additional representations made to the user). Note that a leased service may represent a subset of the available services, so that an entity may serve its own users for certain services whereas for other set of services are performed by another service entity.

Users and enterprises being served by a one big enterprise, may then move to another enterprise or migrate the capabilities to provide the service into the enterprise itself. This enables leasing a "service" but then becoming self sufficient in providing the service and a transition between the two modes which is smooth.

The flexible relationships allow for changes and accommodate growth or consolidation amongst the service providers (system entities). It allows temporal delegation of duties between organizations.

The flexible capability structure allows users to change their status as a result of changes in their relationships. Users, for example, may get more credit as they are served by the systems. Users may move part of their business between service providers. Similar relationships between entities may change as well (alliances, affinity organization, supplementary suggestions, promotions, etc.).

Thus are provided methods for operating infrastructure and applications for cryptographically-supported services. One skilled in the art will appreciate that the present invention can be practiced by other than the described embodiments, which are presented for purposes of illustration and not limitation, and the present invention is limited only by the claims that follow.

What we claim is:

1. In an infrastructure in which some of a plurality of entities provide cryptographically supported services, a method of registering a subscriber entity of a plurality of entities at a principal entity of a plurality of entities, the method comprising:

the subscriber entity requesting service from the principal entity by sending a request message to a registrar entity of the plurality of entities;

the registrar entity verifying the subscriber entity and forwarding the request for service to the principal entity;

the principal entity storing the forwarded request and transmitting an acknowledgement message to the registrar entity, the acknowledgement stating acceptance and authentication/authorization information that the subscriber entity requires to obtain or access the requested service; and the registrar entity verifying the authenticity of the received acknowledgement message, and, if correct, forwarding the acknowledgement message to the subscriber entity, wherein the request message contains an indication of a type of service requested by the subscriber entity and contains one or more selected from the following:
(a) a unique reference to the subscriber entity;
(b) attributes about the subscriber entity;
(c) authentication information to be used to authenticate use of the service;
(d) transactional verification information;
(e) a representation by the subscriber entity agreeing to what the subscriber entity accepts;
(f) a preferred service relationship; or
(g) a subscriber entity's authenticator.

2. A method as in claim 1 wherein the unique reference to the subscriber entity is at least one selected from (a) the subscriber entity's identity, (b) a pseudonym for one-time service, or (c) a pseudonym for continued use of the service.

3. A method as in claim 1 wherein a session identifier links future responses to this particular request.

4. A method as in claim 1 wherein the attributes about the subscriber entity include:
(a) a self-representation; and
(b) a third-party representation asserting attributes.

5. A method as in claim 4 wherein said representation and attribute include at least some selected from:
(a) an address;
(b) employment information;
(c) information from one or more other entities needed for service provisioning; or
(d) an authorization from another party.

6. A method as in claim 1 further comprising:
modifying the registration of the subscriber entity at the principal entity.

7. A method as in claim 6 wherein modification is supervised by one or more authorities.

8. A method as in claim 6 wherein registration modification transactions involve managing capabilities.

9. A method as in claim 6 wherein registration modification transactions involve cryptographic key management.

10. A method as in claim 1 further comprising:
moving the registration for service from the principal entity to another entity of said plurality of entities.

11. A method as in claim 10 wherein moving of services is supervised by one or more authorities.

12. A method as in claim 1 wherein the service includes:
operating a cryptographically-supported transaction involving the subscriber entity, the principal entity and possibly one or more additional entities.

13. A method as in claim 1 wherein the subscriber entity comprises a plurality of elements.

14. A method as in claim 13 wherein the plurality of elements are associated with an entity.

15. A method as in claim 1 wherein said service is a subset of a totality of services.

16. A method as in claim 15 wherein another subset of the totality of services to the subscriber entity is provided by an entity different from the principal entity.

17. A method as in claim 1 wherein said service is a warranty service.

18. A method as in claim 16 wherein the subscriber entity can modify the subset of totality of services between entities.

19. A method as in claim 17 wherein said warranty service involves correctness of representation of information.

20. A method as in claim 19 wherein said representation of information is at least one selected from: (a) identity information, (b) financial information; or (c) information derived from provision of service within said infrastructure.

21. A method as in claim 17 wherein the infrastructure includes a mechanism to initiate claims against failed warranty.

22. A method as in claim 1 wherein provision of service may involve an additional entity from said plurality of entities.

23. A method as in claim 22 wherein provision of service is split between said principal entity and said additional entity.

24. A method as in claim 1 wherein provision of service by said principal entity on behalf of said subscriber entity is given by said operating infrastructure to an entity within said plurality of entities.

25. A method as in claim 1 wherein said provision of service by said principal entity involves other entities within said plurality of entities.

26. A method as in claim 1 wherein provision of service involves control of access.

27. A method as in claim 1 wherein at least one of said plurality of entities is an enterprise.

28. A method as in claim 1 wherein at least one of said plurality of entities is a financial institute.

29. A method as in claim 1 wherein said principal entity is a group of elementary entities.

30. A method as in claim 1 wherein provision of service by said principal entity is directed by said subscriber entity.

31. A method as in claim 1 further comprising:
providing, by the principal entity, at least one of a set of various service transactions to the subscriber entity.

32. A method as in claim 31 wherein said providing involves the certification of digital identities.

33. A method as in claim 31 wherein at least one of said service transactions involves assuring an entity's state.

34. A method as in claim 31 wherein at least one of said service transactions involves assuring financial information.

35. A method as in claim 31 wherein at least one of said service transactions involves assurance of identity and assurance of entity's state.

36. A method as in claim 1 wherein some of said plurality of entities are supervised by one or more other entities in at least one transaction.

37. A method as in claim 1, wherein service involves a fee based on a service agreement and contract.

38. A method as in claim 1, wherein added management and one or more additional entities assure integrity of transactions within the infrastructure.

39. A method as in claim 38 wherein integrity of the management function is enhanced by providing two or more independent reports.

40. A method as in claim 38 wherein the management function controls actions of assurance offering entities on a per transaction basis.

41. In an infrastructure in which some of a plurality of entities provide cryptographically supported services, a method of registering a subscriber entity of a plurality of entities at a principal entity of a plurality of entities, the method comprising:
a registrar entity of the plurality of entities receiving a request message from the subscriber entity requesting service from the principal entity;

the registrar entity verifying the subscriber entity and forwarding the request for service to the principal entity for storage by the principal entity; and the registrar entity receiving from the principal entity an acknowledgement message, the acknowledgement stating acceptance and authentication/authorization information that the subscriber entity requires to obtain or access the requested service, verifying the authenticity of the received acknowledgement message, and, if correct, forwarding the acknowledgement message to the subscriber entity, wherein the request message contains an indication of a type of service requested by the subscriber entity and contains one or more selected from the following:

(a) a unique reference to the subscriber entity;
(b) attributes about the subscriber entity;
(c) authentication information to be used to authenticate use of the service;
(d) transactional verification information;
(e) a representation by the subscriber entity agreeing to what the subscriber entity accepts;
(f) a preferred service relationship; or
(g) a subscriber entity's authenticator.

42. A method as in claim 41, wherein the service includes:
operating a cryptographically-supported transaction involving the subscriber entity, the principal entity and possibly one or more additional entities.

43. A method as in claim 41, further comprising:
moving the registration for service from the principal entity to another entity of said plurality of entities.

44. In an infrastructure in which some of a plurality of entities provide cryptographically supported services, a method of registering a subscriber entity of a plurality of entities at a principal entity of a plurality of entities, the method comprising:

the principal entity receiving from a registrar entity of the plurality of entities a forwarded request message by the subscriber entity for service from the principal entity, the request for service sent to the registrar entity by the subscriber entity and the subscriber entity being verified by the registrar entity; and the principal entity storing the forwarded request message and transmitting an acknowledgement message, the acknowledgement stating acceptance and authentication/authorization information that the subscriber entity requires to obtain or access the requested service, to the registrar entity for verification by the registrar entity of the authenticity of the received acknowledgement message, and, if correct, forwarding the acknowledgement message by the registrar entity to the subscriber entity, wherein the forwarded request message contains an indication of a type of service requested by the subscriber entity and contains one or more selected from the following:

(a) a unique reference to the subscriber entity;
(b) attributes about the subscriber entity;
(c) authentication information to be used to authenticate use of the service;
(d) transactional verification information;
(e) a representation by the subscriber entity agreeing to what the subscriber entity accepts;
(f) a preferred service relationship; or
(g) a subscriber entity's authenticator.

45. A method as in claim 44, wherein the service includes:
operating a cryptographically-supported transaction involving the subscriber entity, the principal entity and possibly one or more additional entities.

46. A method as in claim 44, further comprising:
moving the registration for service from the principal entity to another entity of said plurality of entities.

* * * * *